US012811748B2

(12) United States Patent
Park et al.

(10) Patent No.: US 12,811,748 B2
(45) Date of Patent: Nov. 24, 2026

(54) COMMUNICATION DEVICE, ELECTRONIC DEVICE INCLUDING THE SAME, AND METHOD OF TRANSMITTING ACK PACKET

(71) Applicant: SAMSUNG ELECTRONICS CO., LTD., Suwon-si (KR)

(72) Inventors: Seyong Park, Suwon-si (KR); Byungseung Kim, Suwon-si (KR); Gowoon Yang, Suwon-si (KR); Heesu Im, Suwon-si (KR); Eun-Jun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 294 days.

(21) Appl. No.: 18/617,167

(22) Filed: Mar. 26, 2024

(65) Prior Publication Data

US 2024/0333461 A1 Oct. 3, 2024

(30) Foreign Application Priority Data

Mar. 28, 2023 (KR) ........................ 10-2023-0040550
Jun. 27, 2023 (KR) ........................ 10-2023-0082672

(51) Int. Cl.
*H04L 5/00* (2006.01)
*H04W 28/06* (2009.01)
*H04W 80/06* (2009.01)

(52) U.S. Cl.
CPC ........... *H04L 5/0053* (2013.01); *H04W 28/06* (2013.01); *H04W 80/06* (2013.01)

(58) Field of Classification Search
CPC ...... H04L 5/0053; H04W 28/06; H04W 80/06
See application file for complete search history.

(56) References Cited

U.S. PATENT DOCUMENTS

| | | | | |
|---|---|---|---|---|
| 8,761,010 | B2 | 6/2014 | Jinzaki | |
| 9,325,628 | B2 | 4/2016 | Zheng et al. | |
| 10,645,609 | B2 | 5/2020 | Jung et al. | |
| 10,708,393 | B1 | 7/2020 | Thornewell et al. | |
| 10,735,349 | B2 | 8/2020 | Yamashima et al. | |
| 11,652,751 | B2 * | 5/2023 | Goel | H04L 41/0896 370/235 |
| 11,677,669 | B2 * | 6/2023 | Ohta | H04W 28/0273 370/231 |
| 2006/0176862 | A1 | 8/2006 | Ishimori et al. | |

(Continued)

FOREIGN PATENT DOCUMENTS

| | | | | |
|---|---|---|---|---|
| KR | 10-2356912 | B1 | 1/2022 | |
| KR | 20240166867 | A * | 11/2024 | H04L 69/16 |

*Primary Examiner* — Duc C Ho
(74) *Attorney, Agent, or Firm* — Sughrue Mion, PLLC

(57) ABSTRACT

The communication device includes: an interface configured to receive packets; and at least one processing core configured to: based on first network information satisfying a first condition, identify transmission control protocol (TCP) session information and acknowledgment (ACK) numbers of a plurality of first ACK packets that are read from the interface during an aggregation period, transmit a second ACK packet having a greatest ACK number among a plurality of second ACK packets on an uplink, the plurality of second ACK packets having same TCP session information among the plurality of first ACK packets, and discard remaining second ACK packets among the plurality of second ACK packets.

19 Claims, 10 Drawing Sheets

(56) References Cited

U.S. PATENT DOCUMENTS

| | | | | |
|---|---|---|---|---|
| 2013/0133045 | A1* | 5/2013 | Hayes | H04L 63/08 726/5 |
| 2013/0176848 | A1 | 7/2013 | Jinzaki | |
| 2014/0029620 | A1 | 1/2014 | Zheng et al. | |
| 2014/0089471 | A1 | 3/2014 | Pianese et al. | |
| 2018/0368021 | A1 | 12/2018 | Jung et al. | |
| 2019/0140980 | A1 | 5/2019 | Yamashima et al. | |
| 2020/0266955 | A1* | 8/2020 | Agrawal | H04W 72/542 |
| 2026/0067222 | A1* | 3/2026 | Lee | H04L 47/193 |

* cited by examiner

FIG. 8

| | NETWORK INFORMATION |
|---|---|
| DOWNLINK CONDITION | DOWNLINK THROUGHPUT |
| UPLINK CONDITIOIN | UPLINK DATA RATE |
| | L2 BUFFER STATE |
| | L2 RETRANSMIT RATE |

FIG. 9

| | DESCRIPTION |
|---|---|
| DOWNLINK CONDITION | DOWNLINK THROUGHPUT<br>(OR SUM OF DOWNLINK THROUGHPUTS)<br>> THRESHOLD |
| UPLINK CONDITIOIN | UPLINK DATA RATE<br>(OR SUM OF UPLINK DATA RATES) <<br>ACK PACKET RATE |

COMMUNICATION DEVICE, ELECTRONIC DEVICE INCLUDING THE SAME, AND METHOD OF TRANSMITTING ACK PACKET

CROSS-REFERENCE TO RELATED APPLICATIONS

This application is based on and claims priority under 35 U.S.C. § 119 to Korean Patent Application Nos. 10-2023-0040550, filed on Mar. 28, 2023, and 10-2023-0082672, filed on Jun. 27, 2023, in the Korean Intellectual Property Office, the disclosures of which are incorporated by reference herein in their entireties.

BACKGROUND

1. Field

The disclosure relates to a communication device, an electronic device including the same, and a method of transmitting an acknowledgement (ACK) packet.

2. Description of the Related Art

In a communication environment such as a wireless network, uplink and downlink may be set asymmetrically, which means that a data rate of the uplink may be lower than that of the downlink. As a result, in a scenario where data packets are received on the downlink and ACK packets are transmitted on the uplink, the lower data rate of the uplink may cause the ACK packets to be pending, which reduces a downlink throughput. In addition, in another scenario where data packets are transmitted and received in both the uplink and the downlink, the ACK packets on the uplink may use up resources and reduce a uplink throughput.

SUMMARY

Provided are a communication device, an electronic device including the same, and a method of transmitting an ACK packet, for efficiently transmitting an ACK packet.

According to an aspect of the disclosure, a communication device includes: an interface configured to receive packets; and at least one processing core configured to: based on first network information satisfying a first condition, identify transmission control protocol (TCP) session information and acknowledgment (ACK) numbers of a plurality of first ACK packets that are read from the interface during an aggregation period, transmit a second ACK packet having a greatest ACK number among a plurality of second ACK packets on an uplink, the plurality of second ACK packets having same TCP session information among the plurality of first ACK packets, and discard remaining second ACK packets among the plurality of second ACK packets.

According to an aspect of the disclosure, an electronic device includes: a main processor configured to generate a group of packets; and a communication processor configured to, based on first network information satisfying a first condition, transmit a first ACK packet having a greatest ACK number among a plurality of first ACK packets on an uplink, and not transmit another first ACK packet having an ACK number less than the greatest ACK number among the plurality of first ACK packets, wherein the plurality of first ACK packets have same first TCP session information among the group of packets received from the main processor during the aggregation period.

According to an aspect of the disclosure, a method of transmitting an acknowledgment (ACK) packet by a communication device, the method includes: obtaining first network information; based on the first network information satisfying a predetermined condition, enabling an aggregation mode; transmitting a ACK packet having a greatest ACK number among a plurality of ACK packets having same TCP session information on an uplink during an aggregation period of the aggregation mode; and discarding another ACK packet having an ACK number less than the greatest ACK number among the plurality of ACK packets.

BRIEF DESCRIPTION OF DRAWINGS

The above and other aspects, features, and advantages of certain embodiments of the disclosure will be more apparent from the following description taken in conjunction with the accompanying drawings, in which:

FIG. 8 is a diagram illustrating an example of network information used for determining an aggregation period in a communication device according to some embodiments;

FIG. 9 is a diagram illustrating an example of a condition used for determining an aggregation period in a communication device according to some embodiments.

DETAILED DESCRIPTION

Figure 1:
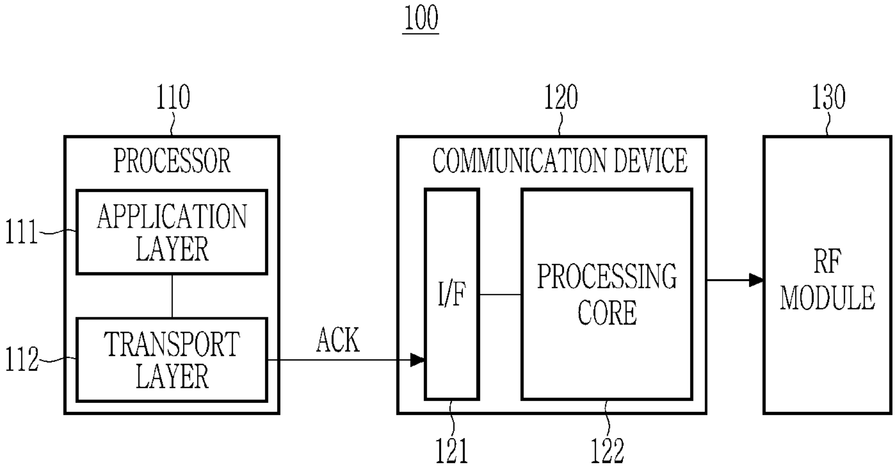
FIG. 1 is a block diagram illustrating an example of an electronic device according to some embodiments.

In the following detailed description, only certain embodiments of the disclosure have been shown and described, simply by way of illustration. As those skilled in the art would realize, the described embodiments may be modified in various different ways, all without departing from the spirit or scope of the disclosure.

Accordingly, the drawings and description are to be regarded as illustrative in nature and not restrictive. Like reference numerals designate like elements throughout the specification. The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The embodiments may be described and illustrated in terms of blocks, as shown in the drawings, which carry out a described function or functions. These blocks, which may be referred to herein as an application layer, a transport layer, an interface (I/F), a processing core, a radio frequency (RF) module, a transmission control protocol (TCP) session database (DB), an acknowledgment (ACK) switch, a layer-2 physical (L2/PHY) layer, a network information DB or the like may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

FIG. 1 is a block diagram illustrating an example of an electronic device according to some embodiments.

Referring to FIG. 1, in some embodiments, an electronic device 100 may include a processor 110 and a communication device 120.

In some embodiments, the electronic device 100 may include, by way of non-limiting examples, a smartphone, a tablet, a laptop computer, a personal computer (PC), a server, a personal digital assistant (PDA), an enterprise digital assistant (EDA), a digital camera, a portable multimedia player (PMP), a portable navigation device (PND), a handheld game console, a mobile internet device (MID), a multimedia device, a wearable computer, an internet of things (IoT) device, an internet of everything (IoE) device, or an e-book.

The processor 110 may be a main processor that controls an overall operation of the electronic device 100. The processor 110 may be implemented as at least one of various processing units including, by way of non-limiting examples, an application processor (AP), a central processing unit (CPU), and a graphics processing unit (GPU). The processor 110 may generate a data packet to be transmitted and transfer the data packet to the communication device 120, and may generate an ACK packet for a received data packet and transfer the ACK packet to the communication device 120. Although one processor 110 is illustrated in FIG. 1, the processor 110 may refer to multiple processors (e.g., two or three processors that are stacked in one package or are disposed in multiple packages). Thus, in the disclosure, the processor 110 may refer to 'at least one processor'.

In some embodiments, a protocol layer of the processor 110 may include an application layer 111 and a transport layer 112. By way of non-limiting examples, the application layer 111 may include an application layer, a presentation layer, and a session layer, and the transport layer 112 may include a transmission control protocol (TCP) layer.

A data packet received via the communication device 120 may be transferred to the application layer 111 through the transport layer 112. The transport layer (e.g., TCP layer) 112 may generate, based on a sequence number of the data packet, an ACK packet that includes an ACK number indicating a sequence number of a next data packet the electronic device 100 expects to receive. The transport layer (e.g., TCP layer) 112 may transfer the ACK packet to the communication device 120. The ACK packet may further include TCP session information. The TCP session information may indicate a TCP session, and may include, for example, a TCP port and an IP address. The TCP port may include a first TCP port of a source (or a sender) and a second TCP port of a destination (or a receiver), and the IP address may include a first Internet Protocol (IP) address of the source and a second IP address of the destination.

The transport layer 112 may generate a data packet based on data transferred by the application layer 111, and transfer the data packet including a serial number to the communication device 120. The data packet may further include TCP session information. The TCP session information may include, for example, a TCP port and an IP address. The TCP port may include a TCP port of a source (or a sender) and a TCP port of a destination (or a receiver), and the IP address may include an IP address of the source and an IP address of the destination.

The communication device 120 may transmit the data packet and the ACK packet received from the processor 110 to the outside. In some embodiments, the communication device 120 may be a communication processor (CP). The communication processor may be called a modem. In an aggregation mode (or a predetermined mode), the communication device 120 may selectively transmit ACK packets transferred to the communication device 120 every aggregation period (or predetermined period). In some embodiments, the communication device 120 may transmit an ACK packet with a greatest ACK number among ACK packets having the same TCP session information during the predetermined period, and discard remaining ACK packets without transmitting the remaining ACK packets.

In some embodiments, the communication device 120 may include an interface (I/F) 121 and a processing core 122. The interface 121 may be an interface with the processor 110, and may receive the data packet and the ACK packet from the processor 110. In some embodiments, the interface 121 may be an Application Processor-Communication Processor (AP-CP) interface. The processing core 122 may read and process the data packet and the ACK packet transferred to the interface 121. Although one processing core 122 is illustrated in FIG. 1, the processing core 122 may refer to multiple processing cores. Thus, in the disclosure, the processing core 122 may refer to 'at least one processing core'.

In some embodiments, the communication device 120 may support one or more of various communication specifications. The various communication standards may include, by way of non-limiting examples, fifth generation (5G) new radio (NR), long-term evolution (LTE), universal mobile telecommunications system (UMTS), global system for mobile communications (GSM), Bluetooth, and Wi-Fi.

In some embodiments, the processor 110 and the communication device 120 may each be implemented as a separate integrated circuit or system-on-chip (SoC). In some other embodiments, the processor 110 and the communication device 120 may be implemented on the same integrated circuit or SoC.

In some embodiments, the electronic device 100 may further include an RF module 130 that converts baseband signals such as the data packets and the ACK packet into radio frequency (RF) signals and transmits the RF signals to a wireless network. In some other embodiments, the RF module 130 may be included in the communication device 120.

Figure 2:
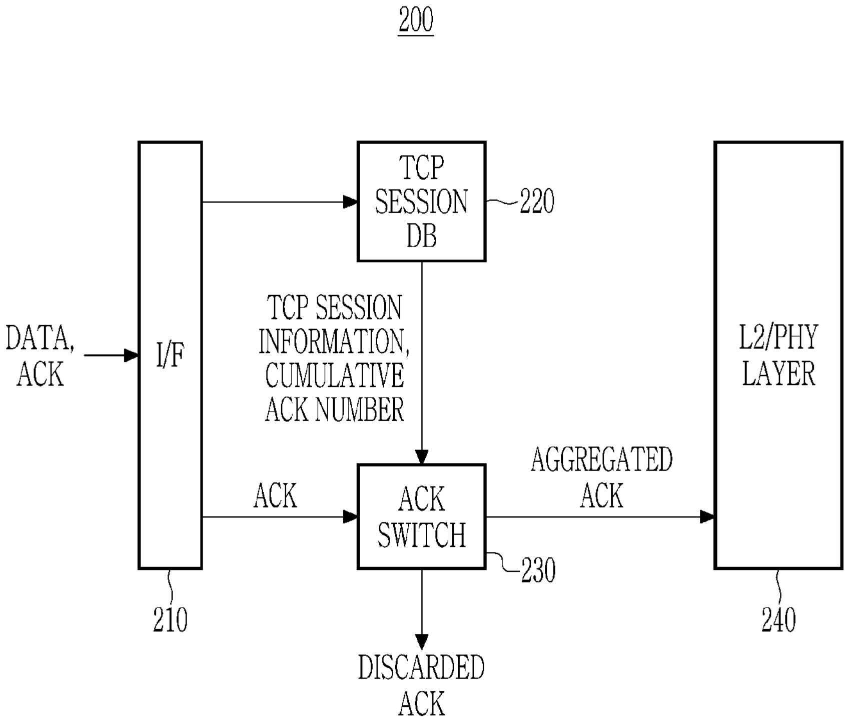
FIG. 2 is a block diagram illustrating an example of a communication device according to some embodiments.

FIG. 2 is a block diagram illustrating an example of a communication device according to some embodiments.

Referring to FIG. 2, in some embodiments, a communication device 200 may include an interface 210, a TCP session database (DB) 220, an ACK switch 230, and a layer-2 (L2)/physical (PHY) layer 240.

The interface 210 may be an interface with a main processor (e.g., 110 in FIG. 1) of an electronic device. In some embodiments, the interface 210 may be an AP-CP interface. The interface 210 may store data packets and ACK packets that are transferred from the main processor 110 of the electronic device. In some embodiments, the interface 210 may include a packet receiver that receives the data packets and the ACK packets. The packet receiver may be implemented with, by way of non-limiting examples, a buffer.

The TCP session database 220 may read packets from the interface 210 at every aggregation period, and may store TCP session information of ACK packets among the packets transferred to (or coming into) the communication device 200. The TCP session information may include an IP address and a TCP port. The TCP session database 220 may also store a greatest ACK number among ACK numbers of ACK packets having the same TCP session information as a cumulative ACK number for that TCP session information. In some embodiments, the TCP session database 220 may reset the stored TCP session information and cumulative ACK number at every aggregation period, and may read packets from the interface 210 again to store updated TCP session information and cumulative ACK number.

In some embodiments, a plurality of ACK packets may be transferred to the communication device 200 during an aggregation cycle. If TCP session information of an incoming ACK packet has not been stored in the TCP session database 220, the TCP session database 220 may store the TCP session information of the incoming ACK packet, and may store an ACK number of the incoming ACK packet as a cumulative ACK number of that TCP session information. In contrast, if the TCP session information of the incoming ACK packet has been stored in the TCP session database 220, the TCP session database 220 may compare the ACK number of the incoming ACK packet with a cumulative ACK number of that TCP session information. If the ACK number of the incoming ACK packet is greater than the cumulative ACK number, the TCP session database 220 may update the cumulative ACK number of the TCP session information with the ACK number of the incoming ACK packet. If the ACK number of the incoming ACK packet is less than or equal to the cumulative ACK number, the TCP session database 220 may not update the cumulative ACK number of the TCP session information (i.e., may maintain the cumulative ACK number of the TCP session information). In this way, the TCP session database 220 may store the TCP session information and cumulative ACK numbers of the incoming ACK packets during the aggregation period.

The ACK switch 230 may read ACK packets from the interface 210. When the aggregation mode is not enabled (or set), the ACK switch 230 may forward (or bypass) the ACK packets read from (or transferred from) the interface 210 to the L2/PHY layer 240. The ACK packets may be transmitted to an uplink via the L2/PHY layer 240. When the aggregation mode is set, the ACK switch 230 may identify TCP session information and an ACK number of an ACK packet read from the interface 210. In some embodiments, the ACK switch 230 may parse the ACK packet into an IP address, a TCP port, and the ACK number, and may identify the TCP session information based on the IP address and the TCP port. The ACK switch 230 may retrieve a cumulative ACK number of the identified TCP session information from the TCP session database 220, and may compare the cumulative ACK number with the ACK number of the ACK packet. The ACK switch 230 may forward the ACK packet to the L2/PHY layer 240 if the ACK number of the ACK packet is equal to the cumulative ACK number, and may discard the ACK packet if the ACK number of the ACK packet is less than the cumulative ACK number. The ACK packet forwarded to the L2/PHY layer 240 may be transmitted on the uplink.

In some embodiments, a period (referred to as a "packet transfer period") during which the communication device 200 reads the packets from the interface 210 may be fixed, and an aggregation period may be determined based on the packet transfer period. For example, if the packet transfer period is k milliseconds (msec), the aggregation period may be determined as n times k milliseconds. For example, n may be an integer between zero and a predetermined number (e.g., five). Thus, if n is zero, the aggregation period may also be zero, which may be a case in which the aggregation mode is not enabled. For example, if k is one (i.e., ACK packets are transferred from the main processor 110 to the communication device 200 every 1 msec) and n is two, the aggregation period may be 2 msec. Thus, the communication device 200 may store TCP session information and cumulative ACK numbers of ACK packets that are transferred for 2 msec, and then compare an ACK number of each ACK packet transferred for 2 msec with the corresponding cumulative ACK number. Thus, as n increases, a proportion of ACK packets that are aggregated in the aggregation mode (i.e., an aggregation ratio) may increase.

According to the above-described embodiments, some ACK packets having the same TCP session are not transmitted within the aggregation period (e.g., ACK packet(s) having one ACK number per TCP session is transmitted), thereby reducing the load caused by transmitting ACK packets. Due to transmission of fewer ACK packets, uplink and downlink throughputs may be improved. Additionally, applying the above-identified embodiments to the communication device 200 may affect a small impact corresponding to the aggregation period on a TCP round-trip time (RTT).

In some embodiments, the TCP session database 220, the ACK switch 230, and/or the L2/PHY layer 240 may be implemented by a processing core (e.g., 122 in FIG. 1) of the communication device 200.

Figure 3:
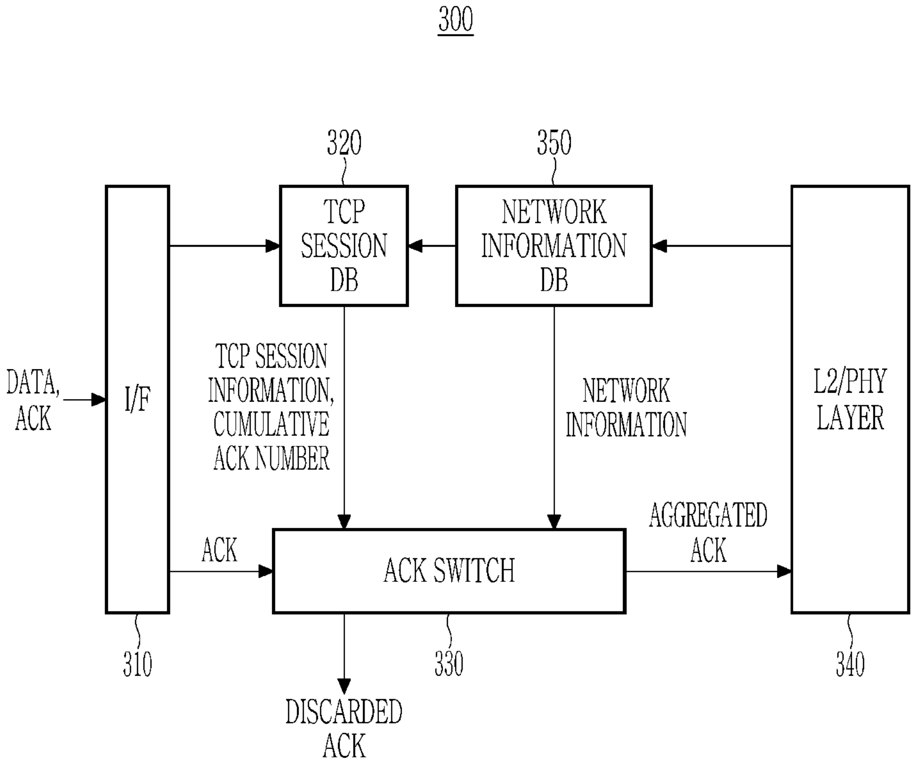
FIG. 3 is a block diagram illustrating an example of a communication device according to some embodiments.

FIG. 3 is a block diagram illustrating an example of a communication device according to some embodiments.

Referring to FIG. 3, in some embodiments, a communication device 300 may include an interface 310, a TCP session database 320, an ACK switch 330, an L2/PHY layer 340, and a network information database 350. Since the interface 310, the TCP session database 320, the ACK switch 330, and the L2/PHY layer 340 perform similar operations to the interface 210, the TCP session database 220, the ACK switch 230, and the L2/PHY layer 240 described with reference to FIG. 2, detailed descriptions thereof are omitted.

The network information database 350 may store network information of the communication device 300, and may periodically update the network information. In some embodiments, the network information may include an uplink data rate and a downlink throughput. In some embodiments, the uplink data rate may be an uplink PHY data rate. In some embodiments, the network information may further include information of the L2/PHY layer 340 that may affect the uplink data rate and/or the downlink throughput. In some embodiments, the information of the L2/PHY layer 340 may include radio access technology (RAT) information indicating a physical connection method that the communication device 300 is currently using for a wireless network. The communication device 300 may use one or more of various RATs including, by way of non-limiting examples, 5G New Radio (NR), Long Term Evolution (LTE), Universal Mobile Telecommunications System (UMTS), Global System for Mobile communications (GSM), Bluetooth, and Wi-Fi. In some embodiments, the information of the L2/PHY layer 340 may further include a cell identifier (cell ID) indicating an associated cell and/or a signal-to-interference-plus-noise ratio (SINR).

The network information database 350 may determine whether to enable an aggregation mode and determine an aggregation period in the aggregation mode, based on the network information. The network information database 350 may transfer information about the aggregation period to the TCP session database 320, and the TCP session database 320 may store TCP session information and a cumulative ACK number of ACK packets every aggregation period. The network information database 350 may also inform the ACK switch 330 whether the aggregation mode is enabled or disabled.

In some embodiments, when the aggregation period is set to short, the communication device 300 may transmit ACK packets quickly, which may reduce an impact of the aggregation period on a throughput but may result in a lower aggregation rate of ACK packets. On the other hand, when the aggregation period is set to long, the aggregation rate of ACK packets may be higher (e.g., the number of discarded ACK packets may increase), which may save uplink resources but may degrade the downlink throughput due to low responsiveness of the ACK packets. Thus, in some embodiments, the network information database 350 may determine the aggregation period by considering a trade-off between the throughput and the aggregation rate.

In some embodiments, the TCP session database 320, the ACK switch 330, the L2/PHY layer 340, and/or the network information database 350 may be implemented by a processing core (e.g., 122 of FIG. 1) of the communication device 300.

Figure 4:
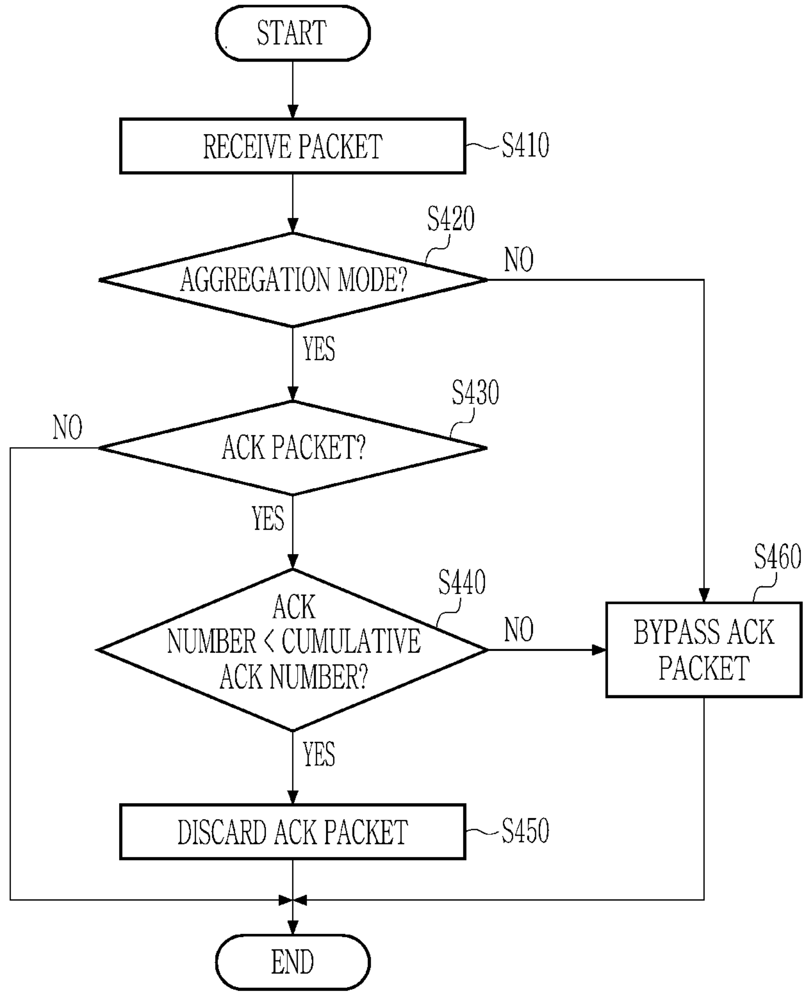
FIG. 4 is a flowchart illustrating an example of a method of transmitting an ACK packet by a communication device according to some embodiments.
Figure 5:
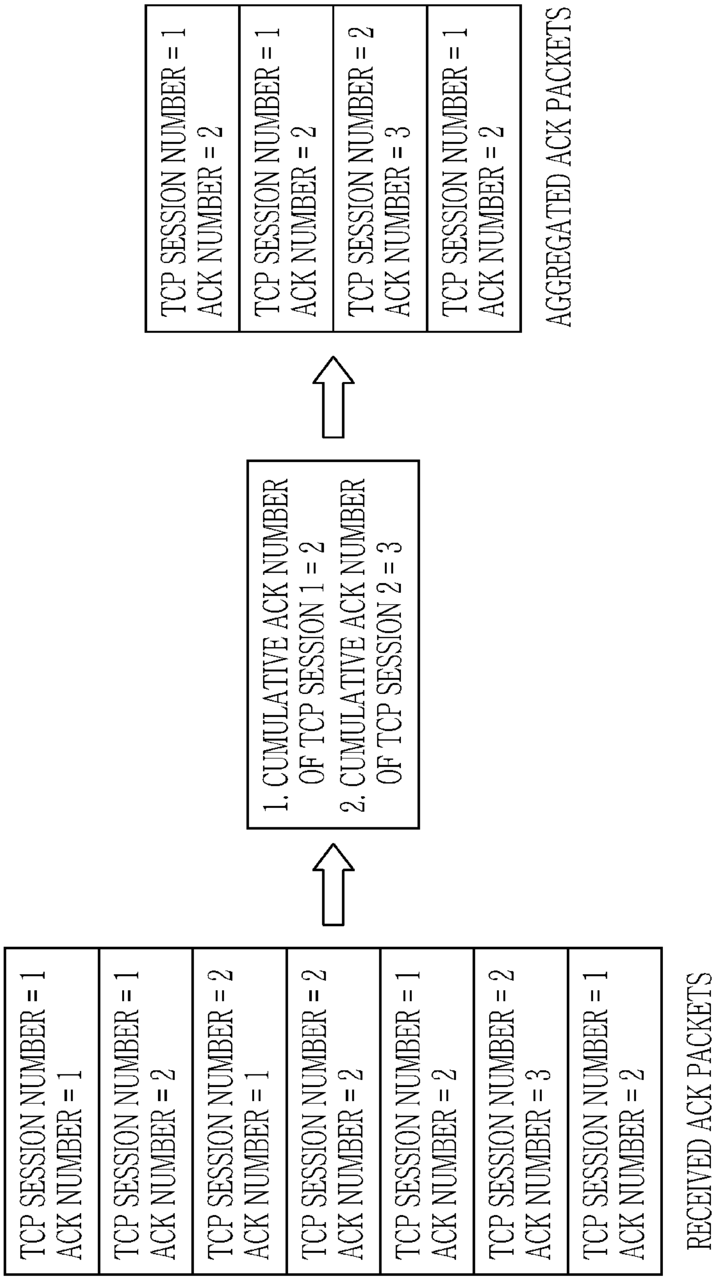
FIG. 5 is a diagram illustrating an example of ACK packets coming into a communication device according to some embodiments.

FIG. 4 is a flowchart illustrating an example of a method of transmitting an ACK packet by a communication device according to some embodiments, and FIG. 5 is a diagram illustrating an example of ACK packets coming into a communication device according to some embodiments.

Referring to FIG. 4, a communication device may receive a packet from a main processor (e.g., 110 of FIG. 1) in S410. The communication device may determine whether an aggregation mode is enabled in S420. In some embodiments, the communication device may determine whether to enable the aggregation mode based on a network information database (e.g., 350 of FIG. 3). If the aggregation mode is not enabled, the communication device may bypass an ACK packet in S460. The bypassed ACK packet may be processed by the communication device and transmitted on an uplink.

If the aggregation mode is enabled, the communication device may determine whether the received packet is an ACK packet in S430. If the received packet is not the ACK packet, the communication device may process the received packet (e.g., a data packet), and may transmit the packet on the uplink. If the received packet is the ACK packet, the communication device may identify TCP session information and an ACK number of the ACK packet, and may compare the ACK number of the ACK packet with a cumulative ACK number of the identified TCP session information in S440. The cumulative ACK number of the identified TCP session information may be a greatest ACK number among ACK numbers of ACK packets, having TCP session information being the same as the identified TCP session information, which are transferred to the communication device during the aggregation period. In some embodiments, the communication device may retrieve the cumulative ACK number corresponding to the TCP session of the received ACK packet based on TCP session information and a cumulative ACK number of a TCP session indicated by the TCP session information, which are stored in a TCP session database (e.g., 220 of FIG. 2 or 320 of FIG. 3) every aggregation period.

For example, as illustrated in FIG. 5, ACK packets having first TCP session information whose TCP session number is one and ACK packets having second TCP session information whose TCP session number is two may be transferred to the communication device in one aggregation period. The ACK packets having the first TCP session information may include an ACK packet having an ACK number of one and duplicate ACK packets having an ACK number of two, and the ACK packets having the second TCP session number may include an ACK packet having an ACK number of one, an ACK packet having an ACK number of two, and an ACK packet having an ACK number of three. In this case, the communication device may determine that a cumulative ACK number of a TCP session whose TCP session number is one is two, and a cumulative ACK number of a TCP session whose TCP session number is two is three.

If the ACK number of the ACK packet is less than the cumulative ACK number, the communication device may discard the ACK packet without transmitting the ACK packet in S450. If the ACK number of the ACK packet is equal to the cumulative ACK number, the communication device may bypass the ACK packet in S460. The bypassed ACK packet may be processed by the communication device and transmitted on the uplink. For example, as illustrated in FIG. 5, since the cumulative ACK number for the TCP session having the TCP session number of one is two, the ACK packet having the TCP session number of one and the ACK number of one may be discarded. However, the ACK packet having the TCP session number of one and the ACK number of two may be transmitted without being discarded. In this case, the ACK packet having the ACK number of two is a duplicate ACK packet, so all duplicate ACK packets (e.g., all three ACK packets) may be transmitted. Further, since the cumulative ACK number for the TCP session having the TCP session number of two is three, the ACK packet having the TCP session number of two and the ACK number of one, and the ACK packet having the TCP session number of two and the ACK number of two may be discarded. However, the ACK packet having the TCP session number of two and the ACK number of three may be transmitted without being discarded. Thus, in the example illustrated in FIG. 5, the ACK packet having the TCP session number of one and the ACK number of two, and the ACK packet having the TCP session number of two and the ACK number of three may be ACK packets aggregated in the aggregation period.

On the other hand, if the aggregation mode is not enabled, even an ACK packet having an ACK number less than the greatest ACK number among ACK packets having the same TCP session number may be transmitted without being discarded.

Figure 6:
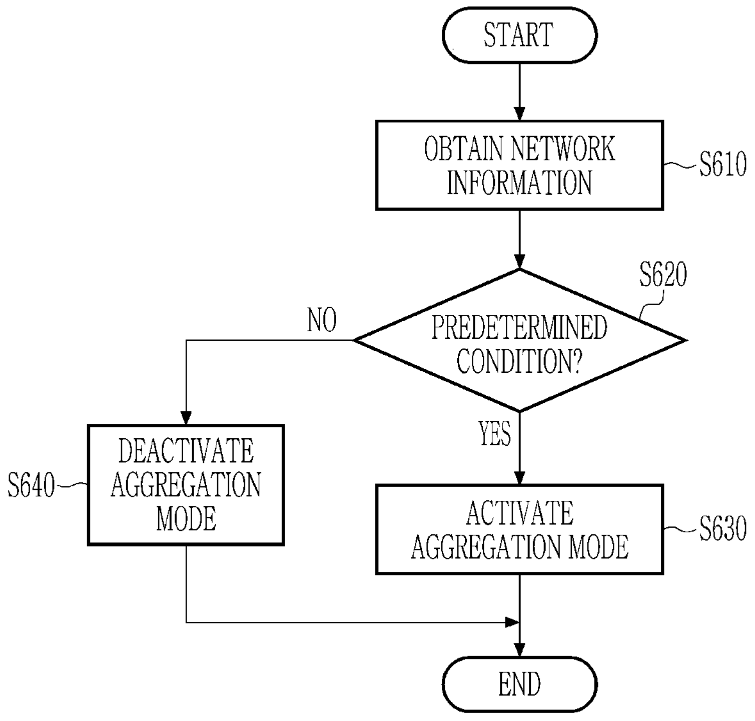
FIG. 6 is a flowchart illustrating an example of a method of determining an aggregation mode in a communication device according to some embodiments.

FIG. 6 is a flowchart illustrating an example of a method of determining an aggregation mode in a communication device according to some embodiments.

Referring to FIG. 6, a communication device may obtain current (first) network information in S610, and may determine whether the current (first) network information satisfies a predetermined condition in S620. In some embodiments, the predetermined condition may include a condition associated with a downlink (referred to as a "downlink condition"). In some embodiments, the downlink condition may include a condition associated with a downlink throughput.

In some embodiments, the network information for determining whether the downlink condition is satisfied may include a downlink throughput. Accordingly, the communication device may obtain a current (first) downlink throughput in S610, and may determine whether the current downlink throughput satisfies the predetermined condition in S620. The downlink throughput may be determined as an amount of data per second received by the communication device through a communication channel. For example, the downlink throughput may be determined as total bits of data received through the communication channel in one second. In some embodiments, the communication device may obtain the downlink throughput from a network information database (e.g., 350 of FIG. 3). In some embodiments, the communication device may calculate the downlink throughput. For example, the communication device may calculate the downlink throughput based on the amount of data received per second. In some other embodiments, a main processor (e.g., 110 in FIG. 1) of an electronic device including the communication device may calculate the downlink throughput, and may provide the calculated downlink throughput to the communication device. For example, the main processor 110 may calculate the downlink throughput based on the amount of data received by the communication device per second. In some embodiments, if the communication device is currently using a plurality of RATs, the downlink throughput may be given as a sum of downlink throughputs at the respective RATs. For example, if the communication device is using LTE and 5G NR, the current downlink throughput may be given as a sum of a downlink throughput at LTE and a downlink throughput at 5G NR.

In some embodiments, the predetermined condition may include a condition in which the current downlink throughput is greater than a threshold. Accordingly, in S620, the communication device may determine whether the current downlink throughput is greater than the threshold. Depending on setting of the threshold, a condition in which the current downlink throughput is greater than the threshold may be interpreted as a condition in which the current downlink throughput is equal to or greater than the threshold. When the downlink throughput is high by many downlink data packets, the many downlink data packets may cause many ACK packets to be generated. Accordingly, the communication device may aggregate the ACK packets to reduce the load of the ACK packets.

In response to the current network information satisfying the predetermined condition (e.g., when the downlink throughput is greater than the threshold), the communication device may enable the aggregation mode in S630. As the aggregation mode is enabled, the communication device may aggregate ACK packets and transmit the aggregated ACK packet(s) on the uplink. In some embodiments, the communication device may aggregate the ACK packets as described with reference to S430 to S460 of FIG. 4. On the other hand, when the downlink throughput does not satisfy the predetermined condition, the communication device may disable the aggregation mode in S640. Accordingly, the communication device may transmit the ACK packets without aggregation. In this way, since the aggregation mode is not enabled when the downlink throughput is less than the threshold, another device (e.g., a server) may receive the ACK packets from the communication device quickly, and may increase a transmission window size.

Figure 7:
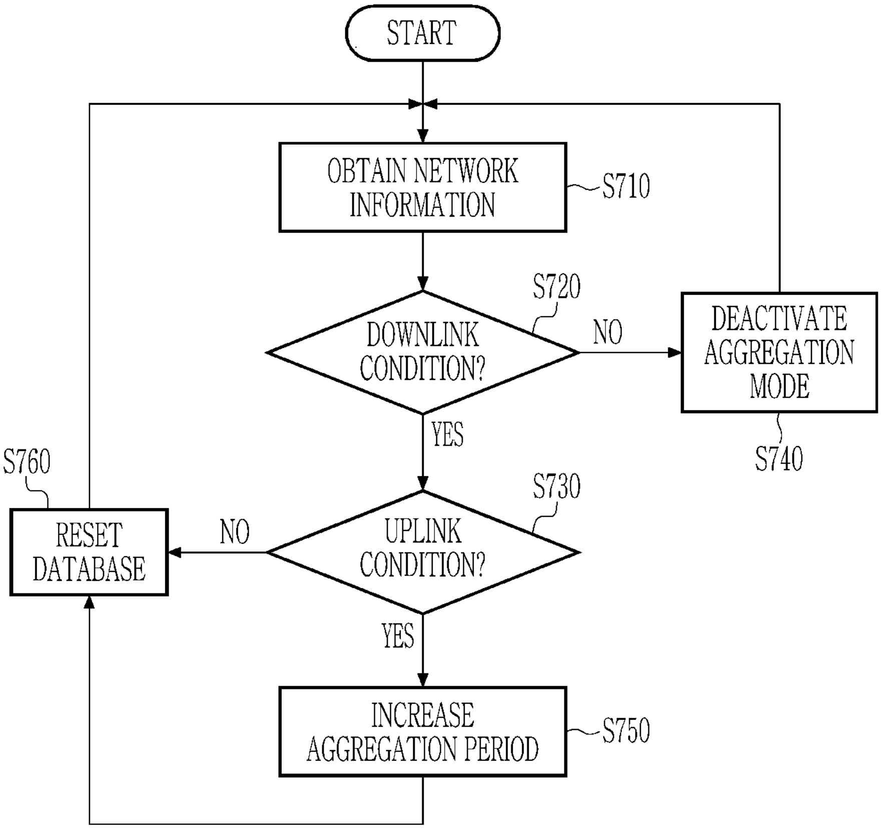
FIG. 7 is a flowchart illustrating an example of a method of determining an aggregation period in a communication device according to some embodiments.

FIG. 7 is a flowchart illustrating an example of a method of determining an aggregation period in a communication device according to some embodiments, FIG. 8 is a diagram illustrating an example of network information used for determining an aggregation period in a communication device according to some embodiments, and FIG. 9 is a diagram illustrating an example of a condition used for determining an aggregation period in a communication device according to some embodiments.

Referring to FIG. 7, a communication device may obtain current network information in S710, and may determine whether the current network information satisfies a predetermined condition in S720 and S730. In some embodiments, the communication device may obtain the current network information from a network information database (e.g., 350 of FIG. 3). In some embodiments, the predetermined conditions may include a downlink condition and a condition associated with an uplink (referred to as an "uplink condition").

In some embodiments, the network information for determining whether the downlink condition is satisfied may include a downlink throughput, as illustrated in FIG. 8. Thus, in S720, the communication device may determine whether the current downlink throughput satisfies the downlink condition. In some embodiments, the downlink condition may include a condition associated with the downlink throughput. In some embodiments, as illustrated in FIG. 9, the downlink condition may include a condition in which the current downlink throughput is greater than a threshold. In response to the current network information not satisfying the downlink condition (e.g., when the current downlink throughput is not greater than the threshold) in S720, the communication device may disable an aggregation mode in S740.

In response to the current network information satisfying the downlink condition (e.g., when the current downlink throughput is greater than the threshold) in S720, the communication device may determine whether the current network information satisfies the uplink condition in S730. In some embodiments, as illustrated in FIG. 8, the uplink condition may include a condition associated with an uplink data rate. In some embodiments, the uplink condition may further include at least one of a condition associated with a buffer state at an L2 layer or a condition associated with a retransmission rate at the L2 layer.

In some embodiments, the network information for determining whether the uplink condition is satisfied may include the uplink data rate. Accordingly, in S730, the communication device may determine whether a current uplink data rate satisfies the uplink condition. In some embodiments, the uplink data rate may be an uplink data rate at the PHY layer. In some embodiments, when the communication device is currently using a plurality of RATs, the uplink data rate may be given as a sum of uplink data rates at the respective RATs. For example, when the communication device is using LTE and 5G NR, the uplink data rate may be given as a sum of an uplink data rate at LTE and an uplink data rate at 5G NR.

In some embodiments, as illustrated in FIG. 9, the uplink condition may include a condition in which the current uplink data rate is less than a rate of ACK packets (referred to as an "ACK packet rate") provided by a main processor (e.g., 110 in FIG. 1) of an electronic device including the communication device. Accordingly, in S730, the communication device may determine whether the current uplink data rate is less than the ACK packet rate. The condition in which the current uplink data rate is less than the ACK packet rate may be interpreted as a condition in which the current uplink data rate is less than or equal to the ACK packet rate, depending on a design of a system. In some embodiments, the communication device may calculate the ACK packet rate as an amount of ACK packets per second provided by the main processor 110. In some embodiments, the communication device may calculate the ACK packet rate every packet transfer period, and may store the calculated ACK packet rate in a TCP session database (e.g., 220 in FIG. 2 or 320 in FIG. 3) or the network information database 350. For example, the communication device may calculate total bits of the ACK packets provided in one second as the ACK packet rate.

In response to the current network information satisfying the uplink condition (e.g., when the current uplink data rate is less than the ACK packet rate) in S730, the communication device may enable the aggregation mode, and may increase an aggregation period in S750. In some embodiments, if the aggregation period has already reached a maximum value, the communication device may maintain the aggregation period without increasing the aggregation period. In some embodiments, the communication device may increase the aggregation period by a predetermined value. As the aggregation period increases, an aggregation rate of the ACK packets may increase. In response to the current network information not satisfying the uplink condition (e.g., when the current uplink data rate is not less than the rate of the ACK packet) in S730, the communication device may not increase the aggregation period, and may determine again whether the network information in a next period satisfies the predetermined condition in S720 and S730.

In some embodiments, when a buffer utilization rate at an L2 layer is high, the communication device may increase the aggregation period, thereby reducing the buffer utilization rate at the L2 layer due to ACK packets. In some embodiments, when the retransmission rate at the L2 layer is high, the communication device may increase the aggregation period, thereby ensuring that retransmissions of other packets are performed smoothly.

As such, if the ACK packets can be transmitted without delay in the current aggregation period (or aggregation rate), the communication device may not change the aggregation period. On the other hand, if the ACK packet rate is greater than the uplink data rate, the communication device may increase the aggregation period because buffering of the ACK packets may occur at an L2/PHY layer (e.g., 340 in FIG. 3).

Next, the communication device may repeat the operations of S710 to S750. In some embodiments, the communication device may perform the operations of S710 to S750 again after a predetermined amount of time has elapsed. The predetermined time may be, for example, the aggregation period. In some embodiments, in S760, the communication device may reset the TCP session database 220 or 320 and the network information database 350, and may store updated information in the TCP session database 220 or 320 and the network information database 350 before performing the operations of S710 to S750 again.

Figure 10:
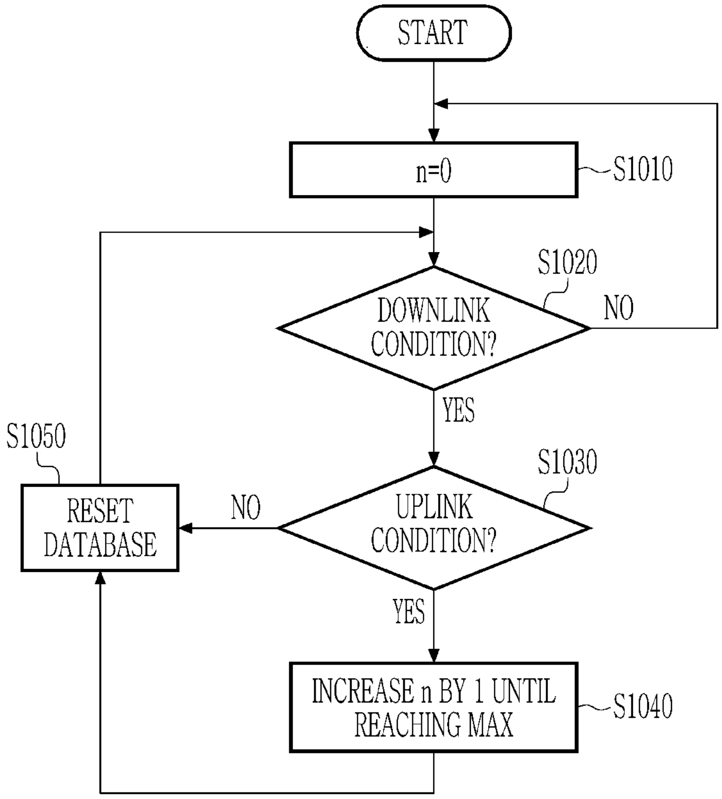
FIG. 10 is a flowchart illustrating an example of a method of determining an aggregation period in a communication device according to some embodiments.

FIG. 10 is a flowchart illustrating an example of a method of determining an aggregation period in a communication device according to some embodiments.

In some embodiments, an aggregation period may be set to n times a default period. By way of non-limiting examples, n may be set to an integer between 0 and a maximum value MAX. If n is zero, the aggregation period may be also zero, so an aggregation mode may not be enabled. If n is an integer greater than zero, the aggregation mode may be enabled. In some embodiments, the default period may be a packet transfer period from a main processor (e.g., 110 of FIG. 1) to a communication device. Referring to FIG. 10, when the aggregation mode is not enabled or as a default value, the communication device may set n to zero in S1010.

The communication device may determine whether current network information satisfies a predetermined condition in S1020 and S1030. In some embodiments, the predetermined condition may include a downlink condition and an uplink condition.

In some embodiments, the communication device may determine whether the current network information satisfies the downlink condition in S1020. In some embodiments, the network information for determining whether the downlink condition is satisfied may include a downlink throughput. In some embodiments, the downlink condition may include a condition associated with the downlink throughput. In some embodiments, the downlink condition may include a condition in which the current downlink throughput is greater than a threshold. In response to the current network information not satisfying the downlink condition (e.g., when the current downlink throughput is not greater than the threshold) in S1020, the communication device may set n to zero in S1010.

In response to the current network information satisfying the downlink condition (e.g., when the current downlink throughput is greater than the threshold) in S1020, the communication device may determine whether the current network information satisfies the uplink condition in S1030. In some embodiments, the uplink condition may include a condition associated with an uplink data rate. In some embodiments, the uplink condition may further include a condition associated a buffer state at an L2 layer and/or a retransmission rate at the L2 layer. In some embodiments, the uplink condition may include a condition in which a current uplink data rate is less than a rate (i.e., ACK packet rate) of ACK packets provided by the main processor 110.

In response to the current network information satisfying the uplink condition (e.g., when the current uplink data rate is less than the ACK packet rate) in S1030, the communication device may increase n in S1040. In some embodiments, if n has already reached the maximum value MAX, the communication device may maintain n without increasing n. In some embodiments, the communication device may increase n by one. On the other hand, in response to the current network information not satisfying the uplink condition (e.g., when the current uplink data rate is not less than the ACK packet rate) in S1030, the communication device may determine again whether the network information in a next period satisfies the predetermined condition in S1020 and S1030.

After increasing n in S1040, the communication device may repeat the operations of S1020 to S1040. In some embodiments, the communication device may perform the operations of S1020 to S1040 again after a predetermined amount of time has elapsed. The predetermined time may be, for example, the aggregation period. In some embodiments, in S1050, the communication device may reset a TCP session database (e.g., 220 of FIG. 2 or 320 of FIG. 3) and a network information database (e.g., 350 of FIG. 3), and may store updated information in the TCP session database 220 or 320 and the network information database 350 before performing the operations of S1020 to S1040 again. Thus, the communication device may determine whether the network information in the next period satisfies the predetermined condition.

In some embodiments, one or more of the elements disclosed above may include or be implemented in one or more processing circuitries such as hardware including logic circuits; a hardware/software combination such as a processor executing software; or a combination thereof. The processing circuitries more specifically may include, by way of non-limiting examples, a central processing unit (CPU), an arithmetic logic unit (ALU), a digital signal processor, a microcomputer, a field programmable gate array (FPGA), a system-on-chip (SoC), a programmable logic unit, a microprocessor, and/or application-specific integrated circuit (ASIC). In some embodiments, the processing circuitry may include a non-transitory computer readable storage device (e.g., a memory) storing one or more instructions, and a processor configured to execute the one or more instructions to implement at least a part of the functionality and/or method described above.

While this disclosure has been described in connection with what is presently considered to be practical embodiments, the disclosure is not limited to the disclosed embodiments. On the contrary, it is intended to cover various modifications and equivalent arrangements included within the spirit and scope of the appended claims.

What is claimed is:

1. A communication device comprising:

an interface configured to receive packets; and at least one processing core configured to:

based on first network information satisfying a first condition, identify transmission control protocol (TCP) session information and acknowledgment (ACK) numbers of a plurality of first ACK packets that are read from the interface during an aggregation period, transmit a second ACK packet having a greatest ACK number among a plurality of second ACK packets on an uplink, the plurality of second ACK packets having same TCP session information among the plurality of first ACK packets, and discard remaining second ACK packets among the plurality of second ACK packets, wherein the at least one processing core is further configured to determine the aggregation period based on a predetermined period of reading packets from the interface.

2. The communication device of claim 1, wherein the first condition comprises a condition associated with a downlink.

3. The communication device of claim 2, wherein the first network information comprises a first downlink throughput, and wherein the condition associated with the downlink comprises a condition in which the first downlink throughput is greater than a threshold.

4. The communication device of claim 3, wherein the first downlink throughput corresponds to a sum of downlink throughputs at two or more radio access technologies.

5. The communication device of claim 1, wherein the at least one processing core is further configured to, based on the first network information satisfying a second condition, increase the aggregation period.

6. The communication device of claim 5, wherein the second condition comprises a condition associated with the uplink.

7. The communication device of claim 6, wherein the first network information comprises a first uplink data rate, and wherein the condition associated with the uplink comprises a condition in which the first uplink data rate is less than an ACK packet rate.

8. The communication device of claim 7, wherein the first uplink data rate corresponds to a sum of uplink data rates at two or more radio access technologies.

9. The communication device of claim 7, wherein the first uplink data rate is a data rate at a physical (PHY) layer.

10. The communication device of claim 6, wherein the condition associated with the uplink comprises at least one of a condition associated with a buffer state at a layer-2 (L2) layer and a condition associated with a retransmission rate at the L2 layer.

11. The communication device of claim 1, wherein the TCP session information comprises an internet protocol address and a TCP port.

12. An electronic device communicating with an external electronic device, comprising:

a main processor configured to generate a group of packets; and a communication processor configured to, based on first network information satisfying a first condition, transmit a first ACK packet having a greatest ACK number among a plurality of first ACK packets on an uplink, and not transmit another first ACK packet having an ACK number less than the greatest ACK number among the plurality of first ACK packets, wherein the plurality of first ACK packets have same first TCP session information among the group of packets received from the main processor during an aggregation period, wherein the aggregation period is determined based on a predetermined period of the group of packets received at an interface of the external electronic device.

13. The electronic device of claim 12, wherein the communication processor is further configured to:

update the first network information; and based on the updated first network information not satisfying the first condition, transmit a plurality of second ACK packets having same second TCP session information among the group of packets received from the main processor.

14. The electronic device of claim 12, wherein the first condition comprises a condition associated with a downlink.

15. The electronic device of claim 12, wherein the communication processor is further configured to, based on the first network information satisfying a second condition, increase the aggregation period.

16. The electronic device of claim 15, wherein the second condition comprises a condition associated with the uplink.

17. A method of transmitting an acknowledgment (ACK) packet by a communication device communicating with an external electronic device, the method comprising:

obtaining first network information;

based on the first network information satisfying a predetermined condition, enabling an aggregation mode;

transmitting a ACK packet having a greatest ACK number among a plurality of ACK packets having same TCP session information on an uplink during an aggregation period of the aggregation mode; and discarding another ACK packet having an ACK number less than the greatest ACK number among the plurality of ACK packets;

wherein the aggregation period is determined based on a predetermined period of the plurality of ACK packets received at an interface of the external electronic device.

18. The method of claim 17, wherein the predetermined condition comprises a condition associated with a downlink.

19. The method of claim 17, further comprising, based on the first network information satisfying a condition associated with the uplink, increasing the aggregation period.

* * * * *